(12) United States Patent
Nutley et al.

(10) Patent No.: US 8,540,032 B2
(45) Date of Patent: Sep. 24, 2013

(54) APPARATUS AND METHOD WITH HYDROCARBON SWELLABLE AND WATER SWELLABLE BODY

(75) Inventors: Kim Nutley, Inverurie (GB); Brian Nutley, Aberdeen (GB)

(73) Assignee: Swelltec Limited, Dyce, Aberdeen (GB)

( * ) Notice: Subject to any disclaimer, the term of this patent is extended or adjusted under 35 U.S.C. 154(b) by 660 days.

(21) Appl. No.: 12/665,160

(22) PCT Filed: Jun. 23, 2008

(86) PCT No.: PCT/GB2008/002150
§ 371 (c)(1),
(2), (4) Date: Apr. 28, 2010

(87) PCT Pub. No.: WO2008/155564
PCT Pub. Date: Dec. 24, 2008

(65) Prior Publication Data
US 2010/0252254 A1    Oct. 7, 2010

(30) Foreign Application Priority Data
Jun. 21, 2007   (GB) .................................. 0711979.5

(51) Int. Cl.
*E21B 33/134* (2006.01)
(52) U.S. Cl.
USPC ........................................ 166/387; 166/192
(58) Field of Classification Search
USPC .................................................. 166/387, 192
See application file for complete search history.

(56) References Cited

U.S. PATENT DOCUMENTS

| | | | | |
|---|---|---|---|---|
| 3,622,527 A | * | 11/1971 | Dieterich et al. | 521/136 |
| 3,624,003 A | * | 11/1971 | Conde et al. | 502/64 |
| 3,625,866 A | * | 12/1971 | Conde | 502/68 |
| 3,999,653 A | * | 12/1976 | Haigh et al. | 206/584 |
| 4,024,882 A | * | 5/1977 | Haigh et al. | 137/2 |

(Continued)

FOREIGN PATENT DOCUMENTS

| | | |
|---|---|---|
| EP | 1780002 A2 | 5/2007 |
| EP | 1793078 A1 | 6/2007 |

(Continued)

OTHER PUBLICATIONS

Perforate. (n.d.) The American Heritage® Dictionary of the English Language, Fourth Edition. (2003). Retrieved Oct. 5, 2012 from http://www.thefreedictionary.com/perforate.*

(Continued)

*Primary Examiner* — Kenneth L Thompson
*Assistant Examiner* — Wei Wang
(74) *Attorney, Agent, or Firm* — Wong, Cabello, Lutsch, Rutherford & Brucculeri LLP

(57) ABSTRACT

A swellable apparatus for filling a space in oil or gas tool such as a wellbore packer is described. The swellable apparatus comprise a hydrocarbon swellable body which swells on exposure to a hydrocarbon fluid, and at least one water swellable body which swells on exposure to a second fluid comprising water. The hydrocarbon swellable body is interposed between the aqueous fluid and the water swellable body and comprises at least one access pathway configured to permit the passage of water to the water swellable body. The pathway may be formed by perforation, or by incorporating an additive into the hydrocarbon material, such as a foaming agent or polyoctenamer. Embodiments of the invention comprise variations in cross-linking in the hydrocarbon swellable body.

24 Claims, 4 Drawing Sheets

(56) References Cited

U.S. PATENT DOCUMENTS

| | | | | |
|---|---|---|---|---|
| 4,468,501 | A | * | 8/1984 | Zampini et al. ............... 525/390 |
| RE31,824 | E | * | 2/1985 | D'Agostino et al. ....... 156/273.3 |
| 4,562,234 | A | * | 12/1985 | Besecke et al. ............... 526/241 |
| 4,853,101 | A | * | 8/1989 | Hruska et al. ................. 204/296 |
| 5,258,454 | A | * | 11/1993 | Berg et al. .................. 525/54.11 |
| 5,310,497 | A | * | 5/1994 | Ve Speer et al. ......... 252/188.28 |
| 5,373,053 | A | * | 12/1994 | Berg et al. .................... 525/54.1 |
| 5,465,792 | A | * | 11/1995 | Dawson et al. ............... 166/295 |
| 5,589,526 | A | * | 12/1996 | Sienel et al. .................. 523/351 |
| 5,674,242 | A | * | 10/1997 | Phan et al. .................... 606/198 |
| 5,988,246 | A | * | 11/1999 | Villani et al. ................. 152/458 |
| 6,020,281 | A | * | 2/2000 | Lavin et al. ...................... 502/68 |
| 6,168,720 | B1 | * | 1/2001 | Lavin et al. ................... 210/689 |
| 6,169,058 | B1 | * | 1/2001 | Le et al. ......................... 507/222 |
| 6,183,248 | B1 | * | 2/2001 | Chishti et al. ..................... 433/6 |
| 6,283,187 | B1 | * | 9/2001 | Villani et al. ................. 152/458 |
| 6,319,345 | B1 | * | 11/2001 | Villani et al. ................. 156/117 |
| 6,341,498 | B1 | * | 1/2002 | DiFoggio ..................... 62/259.2 |
| 6,565,749 | B1 | * | 5/2003 | Hou et al. ................. 210/500.38 |
| 6,599,284 | B2 | * | 7/2003 | Faour .......................... 604/892.1 |
| 6,740,711 | B1 | * | 5/2004 | Lipman et al. ................ 525/216 |
| 7,143,832 | B2 | * | 12/2006 | Freyer ........................... 166/387 |
| 7,169,318 | B1 | * | 1/2007 | Hall .................................. 252/3 |
| 7,373,991 | B2 | * | 5/2008 | Vaidya et al. ................. 166/381 |
| 7,407,007 | B2 | * | 8/2008 | Tibbles ......................... 166/278 |
| 7,527,099 | B2 | * | 5/2009 | Bosma et al. ................. 166/295 |
| 7,665,538 | B2 | * | 2/2010 | Robisson et al. ............. 166/387 |
| 7,712,529 | B2 | * | 5/2010 | Dusterhoft et al. ........... 166/278 |
| 7,938,191 | B2 | * | 5/2011 | Vaidya .......................... 166/387 |
| 8,231,947 | B2 | * | 7/2012 | Vaidya et al. ................ 428/34.1 |
| 2002/0010079 | A1 | * | 1/2002 | Walzer et al. ................. 502/117 |
| 2002/0071113 | A1 | * | 6/2002 | Moran et al. ................. 356/128 |
| 2002/0099361 | A1 | * | 7/2002 | Faour .......................... 604/892.1 |
| 2002/0104328 | A1 | * | 8/2002 | DiFoggio ..................... 62/259.2 |
| 2002/0144759 | A1 | * | 10/2002 | Walsh ......................... 149/19.7 |
| 2003/0085039 | A1 | * | 5/2003 | DiFoggio ..................... 166/302 |
| 2003/0100382 | A1 | * | 5/2003 | Bissonnette et al. .......... 473/351 |
| 2004/0062940 | A1 | * | 4/2004 | Miyamori et al. ............. 428/492 |
| 2004/0106468 | A1 | * | 6/2004 | Bissonnette et al. .......... 473/351 |
| 2004/0241215 | A1 | * | 12/2004 | Lipman ......................... 424/445 |
| 2005/0044862 | A1 | * | 3/2005 | Vetrovec et al. .................. 62/93 |
| 2005/0107548 | A1 | * | 5/2005 | Grabau ....................... 525/331.9 |
| 2005/0109243 | A1 | * | 5/2005 | Jardine et al. ................. 106/713 |
| 2005/0192664 | A1 | * | 9/2005 | Eisert ........................... 623/1.42 |
| 2006/0272806 | A1 | | 12/2006 | Wilkie et al. |
| 2006/0272860 | A1 | * | 12/2006 | Sweatman et al. .............. 175/50 |
| 2007/0015009 | A1 | * | 1/2007 | McGroarty ................... 428/701 |
| 2007/0017675 | A1 | * | 1/2007 | Hammami et al. ............ 166/278 |
| 2007/0027245 | A1 | * | 2/2007 | Vaidya et al. ................. 524/424 |
| 2007/0044962 | A1 | * | 3/2007 | Tibbles ......................... 166/278 |
| 2007/0078248 | A1 | * | 4/2007 | Adachi ........................ 526/317.1 |
| 2007/0151724 | A1 | * | 7/2007 | Ohmer et al. ................. 166/187 |
| 2007/0163777 | A1 | * | 7/2007 | Murray et al. ................ 166/179 |
| 2007/0191545 | A1 | * | 8/2007 | Heiliger et al. ............... 525/191 |
| 2007/0204989 | A1 | * | 9/2007 | Tang ............................. 166/270 |
| 2008/0027402 | A1 | * | 1/2008 | Schmidt et al. ............... 604/368 |
| 2009/0133414 | A1 | * | 5/2009 | Vetrovec et al. .................. 62/94 |
| 2009/0211767 | A1 | * | 8/2009 | Nutley et al. ................. 166/378 |
| 2010/0138158 | A1 | * | 6/2010 | Nutley et al. ..................... 702/6 |
| 2010/0314134 | A1 | * | 12/2010 | Nutley et al. ................. 166/387 |
| 2011/0042096 | A1 | * | 2/2011 | Nutley et al. ................. 166/369 |
| 2012/0145414 | A1 | * | 6/2012 | Nutley et al. ................. 166/387 |
| 2012/0190900 | A1 | * | 7/2012 | Weston et al. ................ 568/916 |

FOREIGN PATENT DOCUMENTS

| | | |
|---|---|---|
| WO | 02/20941 A | 3/2002 |
| WO | 2005/090741 A | 9/2005 |
| WO | 2006/003112 A | 1/2006 |
| WO | 2006/053896 A1 | 5/2006 |

OTHER PUBLICATIONS

International Search Report and Written Opinion regarding corresponding application No. PCT/GB2008/002150, dated Nov. 13, 2008.

* cited by examiner

APPARATUS AND METHOD WITH HYDROCARBON SWELLABLE AND WATER SWELLABLE BODY

CROSS-REFERENCE TO RELATED APPLICATIONS

The present application is a National Stage entry from PCT Patent Application No. PCT/GB2008/002150, filed Jun. 23, 2008, which claims priority to United Kingdom Patent Application No. GB0711979.5, filed on Jun. 21, 2007, the contents of each one incorporated herein by reference.

FIELD OF THE INVENTION

The present invention relates to a swellable apparatus for filling a space in oil or gas apparatus and a method of forming such a swellable apparatus.

BACKGROUND

Well packers are used to create seals in downhole environments. Typically, a well packer is used to form a seal in the annular space between a casing and a tubular located in the casing or between a drilled hole and a tubular located in the drilled hole. Instead of mechanical or inflatable well packers, it is known to form well packers from a material that swells upon contact with hydrocarbons present in the downhole environment. Examples of hydrocarbon swellable materials include natural and synthetic elastomers such as ethylene propylene diene monomer (EPDM) rubbers. Examples of hydrocarbon swellable packers and suitable materials are described in GB 2411918.

In certain applications it is desirable to have a well packer that swells on exposure to hydrocarbons and water. Such well packers comprise material that is capable of swelling upon contact with hydrocarbons and material that is capable of swelling upon contact with water or brine. Such materials may be referred to as "hybrid" swelling materials. A well packer that swells upon contact with both hydrocarbons and water may provide for a proper seal during both the initial and the subsequent stages of production. During an early stage of production the production fluid may be comprised essentially of hydrocarbons and during later stages of production the water content of the production fluid may increase.

WO 05/012686 discloses a swellable material for downhole applications comprising an elastomeric matrix material to which has been added super absorbent polymer (SAP) particles. Such SAP particles can be classified into starch systems, cellulose systems and synthetic resin systems. The SAPs have hydrophilic characteristics by virtue of the presence of alcohols, carboxylic acids, amides or sulphuric acids. Cross-linking between the particles creates a three dimensional network. A compound is mixed with and bound to the material to maintain the desired diffusion gradient and allow for continued absorption of water (and thus continued swelling) in aqueous conditions.

US 2007/0027245 discloses oilfield elements and assemblies comprising elastomeric compositions capable of swelling in oil and water. The compositions comprise the reaction product of linear or branched polymers having residual ethylenic unsaturation with an unsaturated organic monomer having at least one acidic reactive moiety.

The present inventor has appreciated certain shortcomings of known well packers formed of material capable of swelling upon contact with hydrocarbons and water. In particular, swelling of hybrid materials may be inadequate or slow in aqueous (water or brine) conditions.

SUMMARY

It is therefore an object for the present invention to provide a swellable apparatus configured to fill a space in oil or gas apparatus that addresses such shortcomings.

It is a further object for the present invention to provide a method of forming swellable apparatus for filling a space in oil or gas apparatus.

According to a first aspect of the present invention there is provided a swellable apparatus for filling a space in oil or gas apparatus, the swellable apparatus comprising a hydrocarbon swellable body and at least one water swellable body, the swellable apparatus, in use, being operative to fill the space in the oil or gas apparatus when in a swollen condition, the swellable apparatus adopting the swollen condition when at least one of the hydrocarbon swellable body and the at least one water swellable body are swollen, the hydrocarbon swellable body swelling upon contact with a first fluid comprising a hydrocarbon; and the at least one water swellable body swelling upon contact with a second fluid comprising water, the swellable apparatus being configured such that the hydrocarbon swellable body is operative to control access of the second fluid to the at least one water swellable body.

The present inventor has appreciated that known swellable apparatus typically has poor performance as regards swelling of the water swellable body. The present invention provides for control of access of water to the water swellable body to address this problem.

More specifically, the swellable apparatus may be configured such that, in use, the hydrocarbon swellable body is interposed between the second fluid and the at least one water swellable body.

More specifically, the hydrocarbon swellable body may cover the at least one water swellable body.

More specifically, the at least one water swellable body may be embedded in the hydrocarbon swellable body.

Alternatively or in addition, the swellable apparatus may comprise a plurality of water swellable bodies. The plurality of water swellable bodies may, for example, be embedded in the hydrocarbon swellable body such that the water swellable bodies are spaced apart from each other. The water swellable bodies may be evenly and uniformly spaced apart from each other.

Alternatively or in addition, the hydrocarbon swellable body may comprise at least one pathway therethrough. Thus, the at least one pathway may provide for the passage of water comprised in the second fluid through the hydrocarbon swellable body. The provision of at least one pathway may provide for ease of access of water to the water swellable body, e.g. compared with known swellable apparatus.

One drawback of blending water swellable bodies such as superabsorbent polymers with elastomers is that the bodies which are embedded in the elastomer may migrate towards the surface of the elastomer that is exposed to water. This can cause the swellable material to have non uniform swelling. In some cases, blisters may develop on the surface of the elastomer that is exposed to water. If these blisters burst open, they will leave cracks or openings in the elastomer. The size of the pathways may therefore be selected to prevent or restrict the water swellable bodies or water swellable compounds from passing or leaching from the apparatus.

The at least one pathway may be configured to permit the passage of water molecules but prevent the passage of hydrocarbon molecules contained in the first fluid. This limits or eliminates the effect that providing pathways in the apparatus has on the hydrocarbon-swelling characteristics of the apparatus.

More specifically, the at least one pathway may have a diameter of at least about 2.75E-4 micron (about 2.75 Å). Thus, the at least one pathway may allow for the passage of water molecules.

Alternatively or in addition, the at least one pathway may have a diameter of less than about 1000 microns. Thus, the at least one pathway may prevent the passage of the at least one water swellable body, when the at least one water swellable body is embedded in the hydrocarbon swellable body when swollen.

More specifically, the at least one pathway may have a diameter of less than about 100 microns.

Alternatively or in addition, the at least one pathway may have a diameter of less than about 3.8E-4 micron (about 3.8 Å). Such a dimension means that hydrocarbon molecules may not be permitted to pass through the pathway.

Alternatively or in addition, the swellable apparatus may be configured such that the at least one pathway may extend from an outer surface of the hydrocarbon swellable body through the hydrocarbon swellable body to the at least one water swellable body, the outer surface, in use, coming into contact with the first and second fluids.

Alternatively or in addition, the pathway may comprise a bore. The bore may, for example, be formed by mechanical perforation of the hydrocarbon swellable body.

Alternatively or in addition, the pathway may comprise a macroscopic bond structure between the hydrocarbon swellable body and the at least one water swellable body. Such a macroscopic bond structure may, for example, be formed by the inclusion of a polymer additive or a plurality of specific polymer additives, which may comprise a semi-crystalline rubber and/or polyoctenamer such as VESTENAMER®.

The preferred additive is VESTENAMER®, but the additive may comprise one or more rubbers as described in trans-Polyoctenamer, Draxler, Marl A. & Kautschuk, Gummi, Kunststoffe, 34, Nr. March 1981, pp. 185-190; and 25 Jahre Polyoctenamer—der Entwicklungsgang eines Synthesekautschuks vom Laborpraparat zum industriellen Rohstoff, Draxler, Marl A., Kautschuk Gummi Kunststoffe, 42, Nr. October 1989, pp. 868-874, incorporated herein by reference.

It is believed that the addition of a semi-crystalline rubber polyoctenamer results in a macroscopic bond structure which increases the permeability of the apparatus to increase the access of the water to the water swellable bodies. Thus access pathways are provided by the macroscopic bond structure of the material. The macroscopic bond structure also improves the retention of the water swellable body in the hydrocarbon swellable body.

More specifically, the polymer additive, such as VESTENAMER®, may comprise between about 5% and about 15% of a volume of the swellable apparatus.

Changing at least one of a number of pathways and a density of pathways per unit area of the outer surface of the hydrocarbon swellable body may provide for control of access of water molecules to the at least one water swellable body. Thus, at least one of the number of pathways and the pathway density may be increased to increase access of the second fluid to the at least one swellable body. Hence, changing at least one of the number of pathways and the pathway density may control an uptake of the second fluid by the water swellable body whilst not affecting an uptake of first fluid by the hydrocarbon swellable body.

Alternatively or in addition, the hydrocarbon swellable body may have a structure that varies as to an extent of cross-linking across the hydrocarbon swellable body.

More specifically, an extent of cross-linking at an outer surface of the hydrocarbon swellable body may be higher than an extent of cross-linking within the hydrocarbon swellable body, the outer surface, in use, coming into contact with the first fluid. In use, a high extent of cross-linking at the outer surface may control or retard an uptake of hydrocarbon molecules by the hydrocarbon swellable body whilst allowing a part of the hydrocarbon swellable body having a lower extent of cross-linking to have faster penetration of the hydrocarbon molecules and thus faster swelling.

A greater extent of cross-linking at the surface may therefore reduce a rate of uptake of hydrocarbon molecules by the hydrocarbon swellable body. An extent of cross-linking at the surface may be predetermined to set a predetermined rate of uptake of hydrocarbon molecules. This has advantages in certain wellbore environments where it is desirable for swelling of the apparatus to be retarded, for example during run-in of the apparatus to its required depth. An elastomer having an increased cross-linking density may have a reduced tendency to suffer from migration of the water swellable body towards the surface of the elastomer that is exposed to water and thus reduce non-uniform swelling.

More specifically, the extent of cross-linking at the surface of the hydrocarbon swellable body may be between about 10 and about 100 times higher than at a location in the hydrocarbon swellable body spaced apart from the surface of the hydrocarbon swellable body.

In an alternative embodiment of the invention, the swellable apparatus comprises one or more foaming agents or blowing agents. A chemical foaming agent decomposes to release a gas when heated to its activation temperature. A range of different chemical foaming agents may be used with the invention. One example is a dinitrosopentamethylene tetraamine (DNPT) such as OPEX® 80, available from Uniroyal Chemical. Another suitable additive is based on the family of azodicarbonamide type chemicals, for example, those provided by Lanxess Group under the POROFOR® brand.

The foaming agent may be incorporated into the swellable apparatus during mixing, and subsequently treated, for example by heating to decompose and impart a cellular structure to the EPDM matrix material. Preferably, the cellular structure is an open cellular structure. Thus the cellular structure may provide one or more fluid pathways within the hydrocarbon swellable body, which increases the permeability of the swellable apparatus.

Alternatively or in addition, the hydrocarbon swellable body may comprise a polymer. Alternatively or in addition, the hydrocarbon swellable body may comprise an elastomer.

Alternatively or in addition, the hydrocarbon swellable body may comprise ethylene propylene diene monomer rubber (EPDM).

Alternatively or in addition, the hydrocarbon swellable body may be operative to swell upon contact with the first fluid by diffusion of hydrocarbon molecules into the hydrocarbon swellable body.

Alternatively or in addition, the water swellable body may comprise a polymer. More specifically, the water swellable body may comprise a Super Absorbent Polymer (SAP), which may be an acrylic acid and sodium acrylate copolymer such as AQUALIC®.

Alternatively or in addition, the water swellable body may comprise a salt, such as NaCl or CaCl2.

Alternatively or in addition, the water swellable body may be operative to swell upon contact with water by means of diffusion of water molecules into the water swellable body.

More specifically, where the water swellable body comprises a salt, the water swellable body may be operative to swell upon contact with water by means of osmosis.

Alternatively or in addition, the hydrocarbon swellable body may comprise between about 35% and about 50% of a volume of the swellable apparatus and the water swellable body may comprise between about 15% and about 40% of the volume of the swellable apparatus. In use, such a composition may provide for an increase in volume for the swellable apparatus from the unswollen condition to the swollen condition of up to about 300% an environment such as that found in a downhole oil well. For example, within 2-3 weeks of exposure to a 100 degree Celsius fluid mixture containing both a hydrocarbon-based liquid and low salinity aqueous solution.

More specifically, the hydrocarbon swellable body may comprise between about 40% and about 45% of the volume of the swellable apparatus.

Alternatively or in addition, the water swellable body may comprise between about 25% and about 35% of the volume of the swellable apparatus.

Alternatively or in addition, the swellable apparatus may comprise a filler, such as carbon black or silica oxide. More specifically, the filler may comprise between about 15% and about 30% of a volume of the swellable apparatus.

Alternatively or in addition, the swellable apparatus may comprise an activator, which is operative to form a sulphurating compound. More specifically, activator may comprise at least one of zinc oxide and stearic acid. When zinc oxide and stearic acid are present a zinc sulphurating compound may be formed. More specifically, the stearic acid may comprise less than about 2% of a volume of the swellable apparatus.

Alternatively or in addition, the swellable apparatus may comprise a metal oxide, such as zinc oxide. In the curing process the zinc oxide may activate an organic accelerator. Suitable organic accelerators include zinc diacrylate (ZDA), zinc dimethacrylate (ZDMA), triallyl cyanorate (TAC), or triallylisocyanurate (TAIC), including those available from Sartomer Company, Inc of Pennsylvania, USA. An unreacted portion of the zinc oxide may remain available to neutralize sulphur-bearing acidic decomposition products formed during vulcanization. Adequate levels of zinc oxide can contribute markedly to chemical reinforcement, scorch control and resistance to heat-aging and compression fatigue.

More specifically, the metal oxide may comprise less than about 5% of a volume of the swellable apparatus.

Alternatively or in addition, at least one of the first fluid and the second fluid may be comprised in a downhole fluid present in a downhole environment. More specifically, the downhole fluid may comprise at least one of: a completion brine; a water-based drilling mud; an oil-based drilling mud; formation water; and a production fluid, e.g. oil or gas from a well being produced.

Thus, the swellable apparatus may be used, e.g. in a well packer, where it may be activated by water based completion fluids. After a completion operation and during a well production phase, the swellable apparatus may be used to form a seal, even though the swellable may then be mainly exposed to hydrocarbons.

Alternatively or in addition, the swellable apparatus may be operative to increase in volume from an unswollen condition to a swollen condition by up to about 300% when in contact with at least one of the first fluid and the second fluid. Thus, the swellable apparatus may be operative to swell based on simultaneous swelling of both the hydrocarbon swellable body and the water swellable body.

Alternatively or in addition, the swellable apparatus may be configured upon swelling to form a seal in a downhole location.

According to a second aspect of the present invention, there is provided an oil or gas tool comprising swellable apparatus according to the first aspect of the present invention.

More specifically, the oil or gas tool may be a downhole tool, such as a well packer. More specifically, the downhole tool may be at least one of: a flow stemming member; an anchor; a hanger; and a centraliser.

Alternatively or in addition, the oil or gas tool may be a topside tool, such as a fluid handling system.

Further embodiments of the second aspect of the present invention may comprise at least one feature of the first aspect of the invention.

According to a third aspect of the present invention, there is provided a method of forming a swellable apparatus for filling a space in oil or gas apparatus, the method comprising: incorporating a hydrocarbon swellable material and a water swellable material, the hydrocarbon swellable material forming a hydrocarbon swellable body and the water swellable material forming at least one water swellable body, the hydrocarbon swellable material and the water swellable material being incorporated such that, in use, the formed hydrocarbon swellable body swells upon contact with a first fluid comprising a hydrocarbon and the at least one water swellable body swells upon contact with a second fluid comprising water, and the hydrocarbon swellable material and the water swellable material being further incorporated such that, in use, the hydrocarbon swellable body is operative to control access of the second fluid to the at least one water swellable body.

More specifically, the method may further comprise a step of curing the hydrocarbon swellable material to form the hydrocarbon swellable body, e.g. where the hydrocarbon swellable material comprises a polymer.

Alternatively or in addition, the method may comprise incorporating the hydrocarbon swellable material and the water swellable material such that the at least one water swellable body is embedded in the hydrocarbon swellable body. More specifically, the at least one water swellable body may be embedded evenly and uniformly in the hydrocarbon swellable body.

Alternatively or in addition, the method may comprise forming at least one pathway through the hydrocarbon swellable body. More specifically, the at least one pathway may be formed by mechanically perforating the hydrocarbon swellable body.

Alternatively or in addition, the at least one pathway may be formed by incorporating a pathway forming material with the hydrocarbon swellable material and the water swellable material.

More specifically, the pathway forming material may comprise a polymer, which may be a semi-crystalline rubber and/or polyoctenamer such as VESTENAMER®.

Alternatively or in addition, the method may comprise treating the hydrocarbon swellable material such that an outer surface of the hydrocarbon swellable body has a higher extent of cross-linking than within the hydrocarbon swellable body.

More specifically, treating the hydrocarbon swellable material may comprise providing a curing material on an uncured outer surface of the hydrocarbon swellable body.

More specifically, the curing material may comprise at least one of: a cure accelerator; and a curing agent. Cure accelerators or curing agents are well and widely known to those skilled in the art of elastomer or polymer science.

Alternatively or in addition, providing the curing material may comprise at least one of spraying and painting at least one application (e.g. such that it forms a temporary coating to be absorbed by the swellable material) of the curing material onto the outer surface of the hydrocarbon swellable member.

More specifically, the curing material may be provided on the outer surface before the swellable member is cured. The process of curing the swellable member will be well known to persons skilled in the art. More specifically, skilled persons will have a full understanding of parameters associated with temperatures and pressures required to cure swellable members formed of an elastomer; such a process will be familiar to skilled persons as vulcanisation. It will be appreciated that peroxide curing and/or sulphur curing may be used with the present invention.

Alternatively or in addition, the curing material may be dissolved as an aqueous solution or in a solvent.

More specifically, the curing material may have a predetermined concentration when in the form of an aqueous solution or solvent. Thus, the concentration may be changed from one curing step to another such that when the curing material is applied to an outer surface of the hydrocarbon swellable member an extent of cross-linking may be controlled.

In one embodiment of the invention a curing material is provided on the outer surface of a fully or substantially cured material prior to a re-curing process to change the cross-linking structure of the material.

Further embodiments of the third aspect of the present invention may comprise at least one further feature of the first or second aspect of the invention.

The present inventor has appreciated the feature of varying an extent of cross-linking across the hydrocarbon swellable body to be of greater application than described above. Thus, from a fourth aspect of the present invention there is provided a swellable apparatus for filling a space in oil or gas apparatus, the swellable apparatus comprising a hydrocarbon swellable body and at least one water swellable body, the swellable apparatus, in use, being operative to fill the space in oil or gas apparatus when in a swollen condition, the swellable apparatus adopting the swollen condition when at least one of the hydrocarbon swellable body and the at least one water swellable body are swollen, the hydrocarbon swellable body swelling upon contact with a first fluid comprising a hydrocarbon; and the at least one water swellable body swelling upon contact with a second fluid comprising water, the hydrocarbon swellable body having a structure that varies as to an extent of cross-linking across the hydrocarbon swellable body.

More specifically, an extent of cross-linking at an outer surface of the hydrocarbon swellable body may be higher than an extent of cross-linking within the hydrocarbon swellable body, the outer surface, in use, coming into contact with the first fluid.

Alternatively or in addition, the swellable apparatus may be configured such that the hydrocarbon swellable body is operative to control access of the second fluid to the at least one water swellable body.

Further embodiments of the fourth aspect of the present invention may comprise at least one further feature of any previous aspect of the invention.

According to a fifth aspect of the present invention, there is provided a method of forming a swellable apparatus for filling a space in oil or gas apparatus, the method comprising: incorporating a hydrocarbon swellable material and a water swellable material, the hydrocarbon swellable material forming a hydrocarbon swellable body and the water swellable material forming at least one water swellable body, the hydrocarbon swellable material and the water swellable material being incorporated such that, in use, the formed hydrocarbon swellable body swells upon contact with a first fluid comprising a hydrocarbon and the at least one water swellable body swells upon contact with a second fluid comprising water, and treating the hydrocarbon swellable body such that an extent of cross-linking of the hydrocarbon swellable body varies across the hydrocarbon swellable body.

More specifically, the hydrocarbon swellable body may be treated such that an outer surface of the hydrocarbon swellable body has a higher extent of cross-linking than within the hydrocarbon swellable body.

Alternatively or in addition, the hydrocarbon swellable material and the water swellable material may be further incorporated such that, in use, the hydrocarbon swellable body is operative to control access of the second fluid to the at least one water swellable body.

Further embodiments of the fifth aspect of the present invention may comprise at least one further feature of any previous aspect of the invention.

The present inventor has appreciated that providing the hydrocarbon swellable body and the water swellable body such that they form predetermined proportions of a volume of the swellable apparatus may be of greater application than described above. Thus, from a sixth aspect of the present invention there is provided a swellable apparatus for filling a space in oil or gas apparatus, the swellable apparatus comprising a hydrocarbon swellable body and at least one water swellable body, the swellable apparatus, in use, being operative to fill the space in oil or gas apparatus when in a swollen condition, the swellable apparatus adopting the swollen condition when at least one of the hydrocarbon swellable body and the at least one water swellable body are swollen, the hydrocarbon swellable body swelling upon contact with a first fluid comprising a hydrocarbon; and the at least one water swellable body swelling upon contact with a second fluid comprising water, the hydrocarbon swellable body comprising between about 35% and about 50% of a volume of the swellable apparatus and the water swellable body comprising between about 15% and about 40% of the volume of the swellable apparatus.

More specifically, the swellable apparatus may be configured such that the hydrocarbon swellable body is operative to control access of the second fluid to the at least one water swellable body.

Further embodiments of the sixth aspect of the present invention may comprise at least one further feature of any previous aspect of the invention.

According to a seventh aspect of the present invention, there is provided a method of forming a swellable apparatus for filling a space in oil or gas apparatus, the method comprising: incorporating a hydrocarbon swellable material and a water swellable material, the hydrocarbon swellable material forming a hydrocarbon swellable body and the water swellable material forming at least one water swellable body, the hydrocarbon swellable material and the water swellable material being incorporated such that, in use, the formed hydrocarbon swellable body swells upon contact with a first fluid comprising a hydrocarbon and the at least one water swellable body swells upon contact with a second fluid comprising water, the hydrocarbon swellable material and the water swellable material being incorporated such that the hydrocarbon swellable material has a volume of between about 35% and about 50% of a volume of the material being incorporated to form the swellable apparatus and the water swellable material has a volume of between about 15% and about 40% of a volume of the material being incorporated to form the swellable apparatus.

Further embodiments of the seventh aspect of the present invention may comprise at least one further feature of any previous aspect of the invention.

A further aspect of the invention provides a swellable apparatus for filling a space in oil or gas apparatus, the swellable apparatus comprising a hydrocarbon swellable body which swells upon contact with a first fluid comprising a hydrocarbon, and at least one water swellable body which swells upon contact with a second fluid comprising water, the swellable apparatus being operative to fill the space when at least one of the hydrocarbon swellable body and the at least one water swellable body are swollen, wherein in use the hydrocarbon swellable body is interposed between the second fluid and the at least one water swellable body and comprises at least one access pathway therethrough, the pathway configured to permit the passage of water comprised in the second fluid to the water swellable body.

A further aspect of the invention provides a method of forming a swellable apparatus for filling a space in oil or gas apparatus, the method comprising: incorporating a hydrocarbon swellable material and a water swellable material to form a hydrocarbon swellable body which swells upon contact with a first fluid comprising a hydrocarbon, and at least one water swellable body which swells upon contact with a second fluid comprising water; arranging the apparatus such that, in use, the hydrocarbon swellable body is interposed between the second fluid and the at least one water swellable body; providing an at least one access pathway through the hydrocarbon swellable body, the pathway configured to permit the passage of water comprised in the second fluid to the water swellable body.

In an alternative aspect of the invention, the apparatus may comprise a matrix material configured to resist swelling in hydrocarbons (for example a nitrile rubber) and a plurality of water swellable bodies (for example comprising SAP). The matrix rubber is interposed between an aqueous fluid and the water swellable body, but is provided with at least one access pathway therethrough, the pathway configured to permit the passage of water comprised in the aqueous fluid to the water swellable body.

Embodiments of the alternative aspect of the present invention may comprise at least one further feature of any previous aspect of the invention.

BRIEF DESCRIPTION OF THE DRAWINGS

There will now be described, by way of example only, embodiments of the invention with reference to the following drawings, of which.

DETAILED DESCRIPTION

Figure 1:
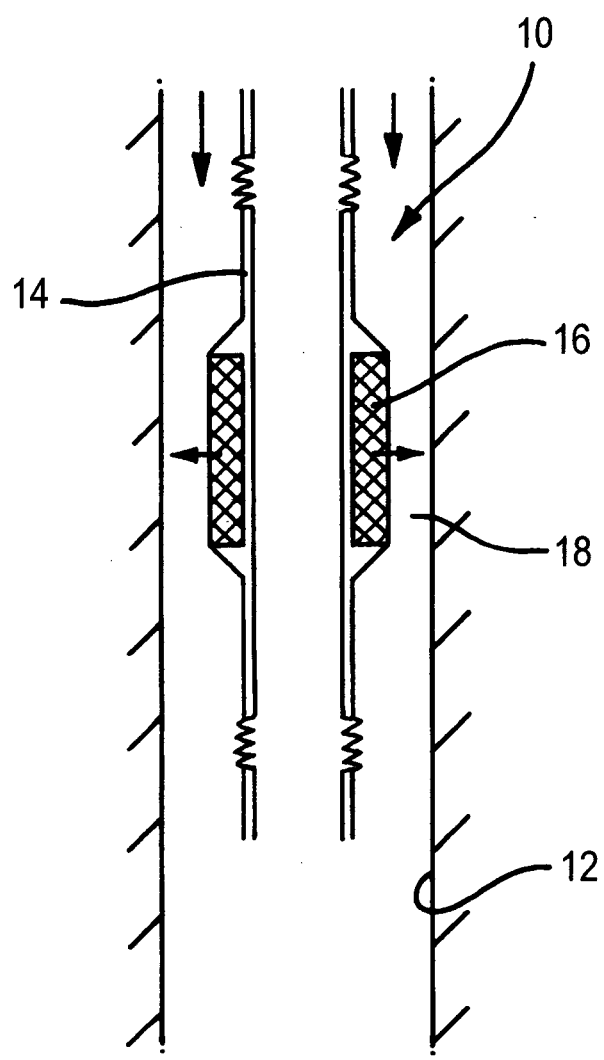
FIG. 1 is a schematic representation of a downhole centraliser tool comprising swellable apparatus in accordance with an embodiment of the invention.

With reference firstly to FIG. 1, there is shown generally at 10 a swellable centraliser located downhole in a subterranean wellbore 12. The apparatus may alternatively be a packer. The centraliser 10 is provided with a swellable apparatus 16, which can swell in the presence of hydrocarbon and aqueous wellbore fluids to fill the annular space 18 and urge downhole components to which the centraliser is attached into a central location within the bore.

To achieve this, the swellable apparatus 16 is formed from a "hybrid" material containing both hydrocarbon and water swellable bodies, as described in more detail with reference to FIG. 2. Access to the water and hydrocarbon swellable bodies by hydrocarbons and water, which will be present in wellbore fluids, is controlled by the structure of the swellable material.

The swellable material 20 has a hydrocarbon swellable body in the form of an ethylene propylene diene monomer rubber (EPDM) elastomer matrix, together with water swellable bodies 32 in the form of super absorbent polymers (SAPs) embedded within the matrix 22. The polymer bodies 32 are evenly distributed and spaced apart from each other throughout the material. Upon being brought into contact with hydrocarbon molecules, the EPDM matrix is caused to swell, while the super absorbent polymers swell upon contact with water. This ensures proper performance of the swellable apparatus to seal the wellbore annulus 18 around the centraliser tool in the presence of both water and hydrocarbon based well fluids, and in the presence of fluids consisting of water and hydrocarbons mixed together.

In this example, hydrocarbon molecules diffuse into the EPDM matrix and water molecules diffuse into the super absorbent polymers. The EPDM matrix makes up about 40% of the material volume, while the super absorbent polymers make up a further 20% of the volume. This helps to achieve the desired swelling behaviour. Further, the material volume includes a carbon black filler, a zinc oxide and stearic acid.

Relative quantities of the above mentioned components used in forming the swellable material of this example are specified in Table A below:

TABLE A

| Component | Phr | % |
|---|---|---|
| EPDM (calendering grade) | 100 | 39.2% |
| HAF N330 Carbon Black | 48 | 18.8% |
| Processing Oil | 20 | 7.8% |
| Zinc Oxide | 5 | 2.0% |
| Peroxide (pure) | 5 | 2.0% |
| Co-agent (TAC or TAIC) | 2 | 0.8% |
| Stearic Acid | 1 | 0.4% |
| VESTENAMER ® | 10 | 3.9% |
| Water Absorbent Resin (AQUALIC ®) | 64 | 25.1% |
| TOTAL | 255 | 100.0% |

Figure 2:
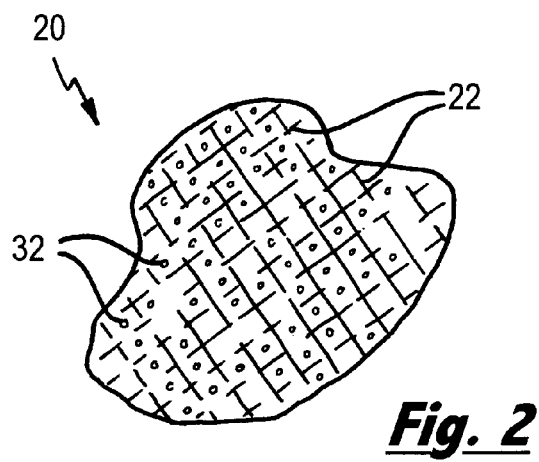
FIG. 2 is a schematic line drawing of a material for the swellable apparatus of FIG. 1.
Figure 3:
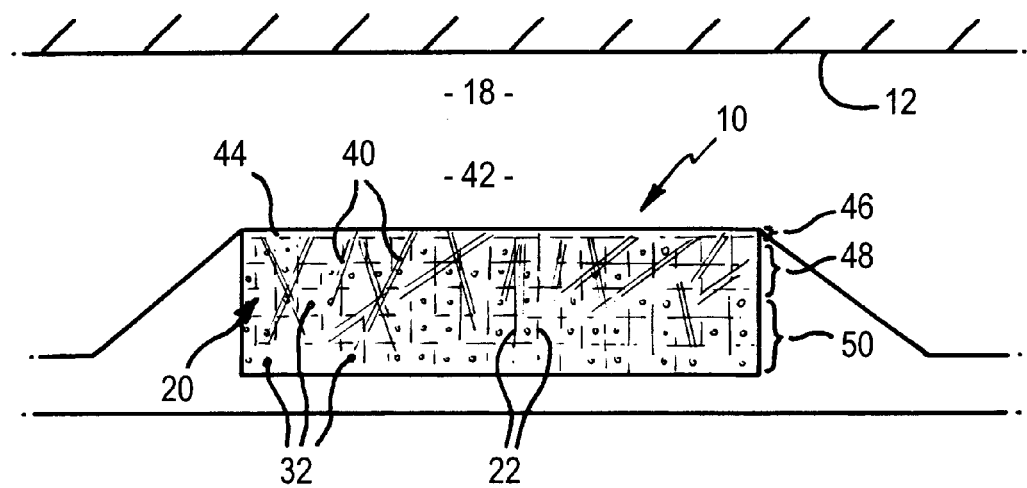
FIG. 3 is a cross-sectional representation of the swellable apparatus of the downhole centraliser tool of FIG. 1.

FIG. 3 provides a more detailed view of the apparatus shown in FIGS. 1 and 2. The apparatus is formed from the material 20 described with reference to FIG. 2.

In FIG. 3 the apparatus is additionally shown having a number of sub-micron pathways 40 through the material 20. The pathways 40 provide access for water molecules from the wellbore environment 42 through the surface region 44 of the wellbore apparatus 10 to the water absorbing polymers. In this example, the pathways 40 are created by mechanical perforations through the material 20. The passageways 40 have internal bores with a diameter of around 25 microns. The pathways 40 are sized to permit water molecules to pass readily through the bores. However, hydrocarbon molecules do not readily pass through the pathways. The density of pathways 40 is selected to provide adequate access of water for the required swelling properties, such as rate and volume expansion, of the swellable apparatus 10.

The perforations are produced in an automated process using a perforating roller body, such as described in U.S. Pat. No. 3,646,639. In alternative embodiments the perforations may be formed using a laser or micro-drilling process using a system of CO2 lasers.

The swellable hybrid material is vulcanised to produce cross-linking of the EPDM matrix 22. In this example, the swellable apparatus has a strongly cross-linked surface region 46, followed below by a region 48 of intermediate cross-linking, and a further main region 50 that is cross-linked to a still lesser degree. The extent of cross-linking controls access of hydrocarbon molecules to the hydrocarbon swellable matrix 22, such that the swelling behaviour of the apparatus in the presence of hydrocarbons can be selected appropriately.

In this case, the cross-linking at the surface is strong to retard the uptake of hydrocarbon molecules and the degree and/or speed of hydrocarbon-activated swelling, while in other regions, which are cross-linked to a lesser extent, hydrocarbon molecules that have been taken up are allowed to diffuse more effectively throughout the material.

In order to create such a cross-linked structure, a cross-linking or curing agent such as zinc diacrylate (ZDA) is deposited onto the outer surface by spraying or brushing. This may be carried out during the construction of the packer apparatus before curing to adjust the cross-linking characteristics and, in turn, the nature of the swelling. The EPDM component of the material is cross-linked upon curing of the EPDM.

Figure 4:
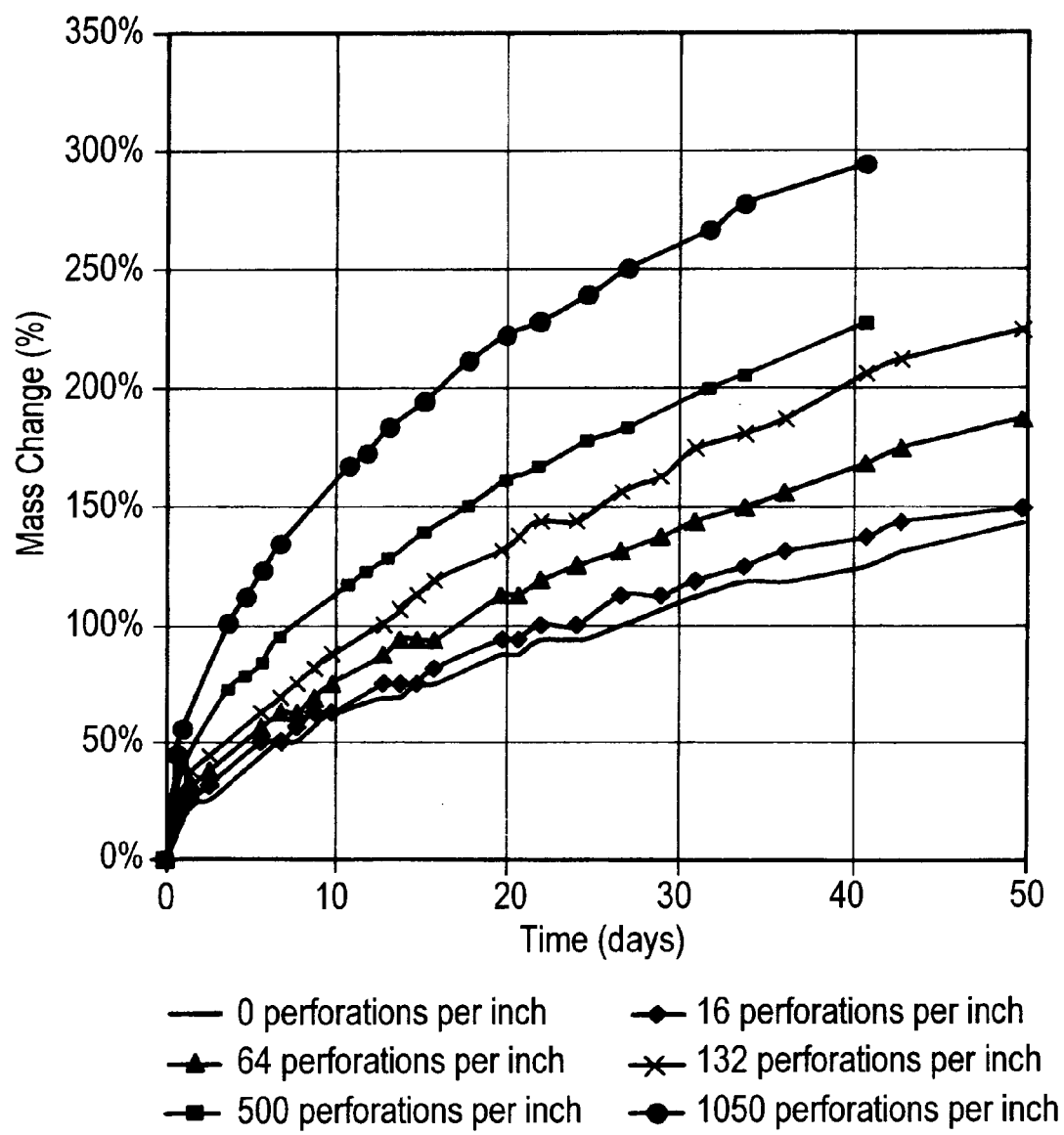
FIG. 4 is a graph of swelling profile for samples of a swellable apparatus in accordance with embodiments of the invention.

Samples of the swellable material with the composition specified in Table A were placed in tap water at a controlled temperature of 80 degrees Celsius, and the mass changes were measured over a period of several days. FIG. 4 is a graph of water-swell profile for samples having a number of different perforation densities. In each case the perforations were mechanically formed in the sample using a perforating needle. The data show that perforating the material has a marked effect on the swell profile. For example, at around 15 days, the sample with 1050 perforations per square inch (approximately 6.45 square cm) had increased in mass by around 200%, compared with an increase of around 75% for the unperforated case. The sample with 132 perforations per square inch (approximately 6.45 square cm) had increased in mass by around 112%. The data also show the maximum mass increases to be higher where the perforation density is higher.

To measure the effect on the swelling profile in a hydrocarbon fluid, samples of the same material composition with no perforations, 16 perforations, 64 perforations and 132 perforations per square inch (approximately 6.45 square cm) were placed in the special kerosine Clairsol 350 MHF™ at a controlled temperature of 80 degrees Celsius. The mass increase of the samples was measured, and the data showed no significant effect on swelling profile, i.e. the perforations did not significantly affect the penetration of the hydrocarbon into the body.

Figure 5A:
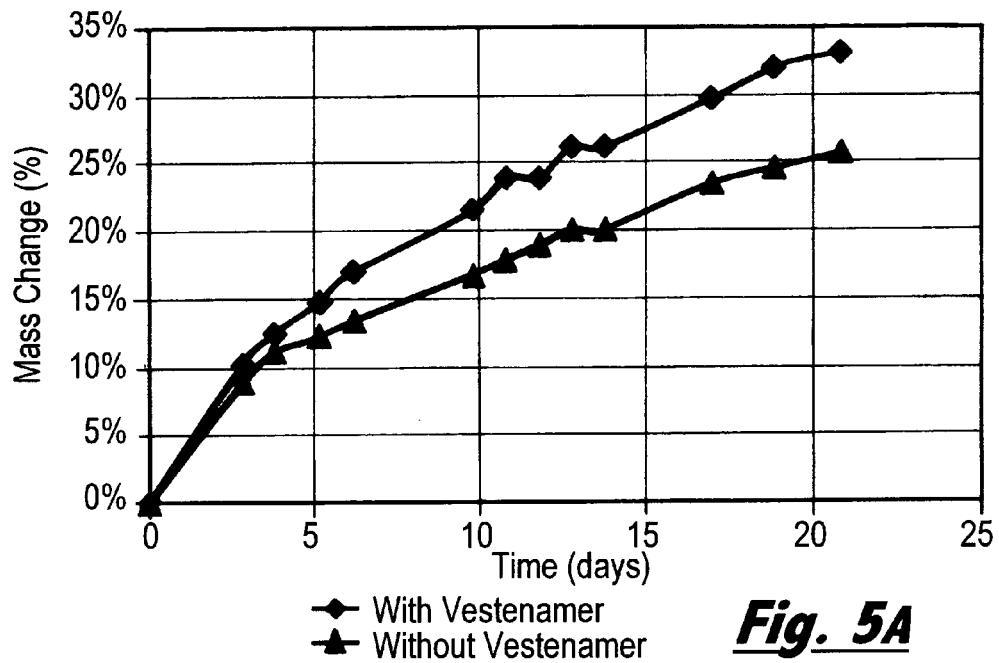
FIG. 5A is a graph of swelling profile for two samples of swellable material in water.

Samples of the material composition specified in Table A were compared with a similar composition with the VESTENAMER® omitted. Samples of each composition were placed in tap water at a controlled temperature of 80° C. FIG. 5A is a plot of percentage mass change versus time for the respective samples. The data show a clear increase in swell profile for the swellable material containing VESTENAMER® compared to the swellable material with no VESTENAMER®.

Figure 5B:
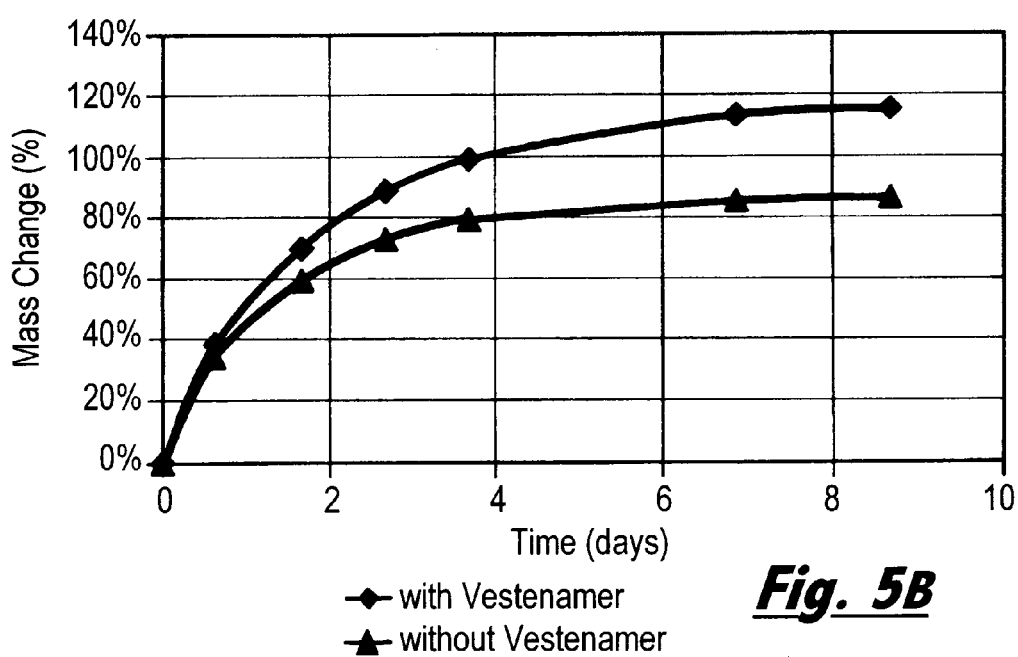
FIG. 5B is a graph of swelling profile for two samples of swellable material in a hydrocarbon fluid.

Identical samples were placed in Clairsol 350 MHF™ at a controlled temperature of 80° C. to model the effect of the VESTENAMER® in a hydrocarbon well fluid environment, with the measured mass increase plotted in FIG. 5B. The data show an improved swell rate and improved maximum swell increase for the swellable material with the VESTENAMER®, compared to the swellable material without VESTENAMER®.

It is believed that the addition of the VESTENAMER® results in a macroscopic bond structure within the material which increases the permeability to wellbore fluids. This increases the access of water contained in a wellbore fluid to the water swellable bodies in the elastomer. In addition, the macroscopic bond structure increases the permeability of the apparatus to hydrocarbon fluids. The data also show that the addition of the VESTENAMER® increases the maximum swell increase of the material. Although the examples shown relate to VESTENAMER®, the addition of other semi-crystalline rubbers and/or polyoctenamers also falls within the scope of the invention. Thus in particular embodiments, the access pathways providing access for water molecules to the super absorbing polymer bodies may be formed by the macroscopic bond structure of the material itself.

In an alternative embodiment of the invention, the swellable apparatus comprises one or more foaming agents or blowing agents. A chemical foaming agent decomposes to release a gas when heated to its activation temperature. A range of different chemical foaming agents may be used with the invention. One example is a dinitrosopentamethylene tetraamine (DNPT) such as OPEX® 80, available from Uniroyal Chemical. Another suitable additive is based on the family of azodicarbonamide type chemicals, for example, those provided by Lanxess Group under the POROFOR® brand.

The foaming agent may be incorporated into the swellable apparatus during mixing, and subsequently treated, for example by heating to decompose and impart a cellular structure to the EPDM matrix material. Preferably, the cellular structure is an open cellular structure. Thus the cellular structure may provide one or more fluid pathways within the hydrocarbon swellable body, which increases the permeability of the swellable apparatus.

The invention provides a swellable apparatus for filling a space in oil or gas tool such as a wellbore packer is described. The swellable apparatus comprise a hydrocarbon swellable body which swells on exposure to a hydrocarbon fluid, and at least one water swellable body which swells on exposure to a second fluid comprising water. The hydrocarbon swellable body is interposed between the aqueous fluid and the water swellable body and comprises at least one access pathway configured to permit the passage of water to the water swellable body. The pathway may be formed by perforation, or by incorporating an additive into the hydrocarbon material, such as a foaming agent or polyoctenamer. Embodiments of the invention comprise variations in cross-linking in the hydrocarbon swellable body.

The described apparatus provides a number of benefits. Importantly, it allows for controlled swelling behaviour in the presence of both hydrocarbon and water that may typically be encountered in operations in wells. It provides for reliability of performance of swellable apparatus in different conditions.

Various modifications and improvements may be made without departing from the scope of the invention herein described. Combinations of features not specifically claimed herein fall within the scope of the invention.

The invention claimed is:

1. A method of forming a swellable apparatus for filling a space in an oil or gas apparatus, the method comprising:
    incorporating a hydrocarbon swellable material and a water swellable material to form a hydrocarbon swellable body which swells upon contact with a first fluid comprising a hydrocarbon, and at least one water swellable body which swells upon contact with a second fluid comprising water;
    arranging the apparatus such that the hydrocarbon swellable body is interposed between the second fluid and the at least one water swellable body during operation; and
    perforating the hydrocarbon swellable body to form a plurality of perforations configured to permit the passage of water comprised in the second fluid between a wellbore annulus and the water swellable body.

2. The method as claimed in claim 1, further comprising: incorporating a material with the hydrocarbon swellable material and the water swellable material that modifies the permeability of the hydrocarbon swellable material.

3. The method as claimed in claim 1, further comprising: incorporating a semi-crystalline rubber with the hydrocarbon swellable material and the water swellable material.

4. The method as claimed in claim 1, further comprising: incorporating a chemical foaming agent with the hydrocarbon swellable material and the water swellable material.

5. The method as claimed in claim 1, comprising producing perforations in an automated process using a perforating roller body.

6. The method as claimed in claim 5, comprising forming perforations using a system of carbon dioxide lasers.

7. The method as claimed in claim 5, comprising forming perforations with a diameter of less than about 1000 microns.

8. The method as claimed in claim 5, comprising forming perforations with a diameter of less than about 100 microns.

9. The method as claimed in claim 1, comprising forming perforations using a laser process or a micro-drilling process.

10. A swellable apparatus for filling a space in an oil or gas apparatus, the swellable apparatus comprising:
    a hydrocarbon swellable body which swells upon contact with a first fluid comprising a hydrocarbon; and
    at least one water swellable body which swells upon contact with a second fluid comprising water,
    wherein the swellable apparatus is operative to fill the space when at least one of the hydrocarbon swellable body and the at least one water swellable body are swollen, and
    wherein the hydrocarbon swellable body is interposed between the second fluid and the at least one water swellable body during operation and comprises a plurality of perforated bores configured to permit the passage of water in the second fluid between a wellbore annulus and the water swellable body.

11. The apparatus as claimed in claim 10, wherein the plurality of perforations is configured to permit the passage of water molecules but prevent the passage of hydrocarbon molecules contained in the first fluid.

12. The apparatus as claimed in claim 10, further comprising a plurality of water swellable bodies embedded in the hydrocarbon swellable body such that the water swellable bodies are spaced apart from each other.

13. The apparatus as claimed in claim 10, wherein the plurality of perforations extend from an outer surface of the hydrocarbon swellable body through the hydrocarbon swellable body to the at least one water swellable body, wherein the outer surface comes into contact with the first and second fluids during operation.

14. The apparatus as claimed in claim 10, further comprising a semi-crystalline rubber additive.

15. The apparatus as claimed in claim 14, wherein the semi-crystalline rubber additive is a polyoctenamer.

16. The apparatus as claimed in claim 15, wherein the semi-crystalline rubber additive comprises between about 5% and about 15% of a volume of the swellable apparatus.

17. The apparatus as claimed in claim 10, wherein the hydrocarbon swellable body has a structure that varies as to an extent of cross-linking across the hydrocarbon swellable body, the extent of cross-linking at an outer surface of the hydrocarbon swellable body being higher than the extent of cross-linking within the hydrocarbon swellable body.

18. The apparatus as claimed in claim 10, further comprising a chemical foaming agent.

19. The apparatus as claimed in claim 10, wherein the hydrocarbon swellable body comprises ethylene propylene diene monomer rubber, and the water swellable body comprises a super absorbent polymer.

20. The apparatus as claimed in claim 10, wherein the perforations are produced in an automated process using a perforating roller body.

21. The apparatus as claimed in claim 10, wherein the perforations are formed using a laser process or a micro-drilling process.

22. The apparatus as claimed in claim 10, wherein the perforations are formed using a system of carbon dioxide lasers.

23. The apparatus as claimed in claim 10, wherein the perforations have a diameter of less than about 1000 microns.

24. The apparatus as claimed in claim 10, wherein the perforations have a diameter of less than about 100 microns.

* * * * *